(12) United States Patent
Cao et al.

(10) Patent No.: US 8,020,675 B2
(45) Date of Patent: Sep. 20, 2011

(54) ELECTROMECHANICAL BRAKE

(75) Inventors: Chi-Thuan Cao, Korntal-Muenchingen (DE); Dietmar Baumann, Hemmingen (DE); Dirk Hofmann, Stuttgart (DE); Herbert Vollert, Vaihingen/Enz (DE); Willi Nagel, Remseck/Hochdorf (DE); Andreas Henke, Diemelstadt (DE); Bertram Foitzik, Ilsfeld (DE); Bernd Goetzelmann, Sindelfingen (DE); Hans Frick, Wiggensbach (DE)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 11/997,255

(22) PCT Filed: Jun. 6, 2006

(86) PCT No.: PCT/EP2006/062910
§ 371 (c)(1),
(2), (4) Date: Jan. 29, 2008

(87) PCT Pub. No.: WO2007/012515
PCT Pub. Date: Feb. 1, 2007

(65) Prior Publication Data
US 2008/0217121 A1   Sep. 11, 2008

(30) Foreign Application Priority Data
Jul. 29, 2005 (DE) .......................... 10 2005 035 607

(51) Int. Cl.
*F16D 65/36* (2006.01)

(52) U.S. Cl. ......... 188/157; 188/31; 188/72.8; 188/162; 188/265

(58) Field of Classification Search ............ 18/157, 18/156, 158, 161, 162, 163, 265, 31, 66, 18/72.1, 72.7, 72.8, 82.8, 82.84
See application file for complete search history.

(56) References Cited

U.S. PATENT DOCUMENTS

| | | | |
|---|---|---|---|
| 6,257,377 B1 | 7/2001 | Schumann | |
| 6,349,801 B1 * | 2/2002 | Koth et al. | 188/72.8 |
| 6,752,249 B1 | 6/2004 | Jungbecker et al. | |
| 6,971,485 B1 * | 12/2005 | Sherman II | 188/72.7 |
| 7,721,853 B2 * | 5/2010 | Chittka | 188/72.8 |

FOREIGN PATENT DOCUMENTS

| | | |
|---|---|---|
| DE | 196 52 229 A1 | 6/1998 |
| DE | 199 45 543 A1 | 3/2001 |
| DE | 102 55 192 A1 | 6/2004 |

* cited by examiner

Primary Examiner — Pam Rodriguez
(74) Attorney, Agent, or Firm — Ronald E. Greigg

(57) ABSTRACT

The invention relates to an electromechanical disk brake which has a switchable freewheel in order to be configured as a parking brake. The switchable freewheel includes a clamping roller freewheel having rollers for locking a motor shaft of an electric motor of the brake. A locating bearing of the motor shaft of an electric motor, and the freewheel are accommodated on a cover of a housing of the electric motor, and all the electric connections of the disc brake are routed via the cover. The number of components used can be reduced considerably by the integrated design. Moreover, the positional tolerances of the freewheel in relation to the motor shaft can be reduced with the aid of the invention.

20 Claims, 2 Drawing Sheets

ELECTROMECHANICAL BRAKE

CROSS-REFERENCE TO RELATED APPLICATIONS

This application is a 35 USC 371 application of PCT/EP 2006/062910 filed on Jun. 6, 2006.

BACKGROUND OF THE INVENTION

1. Field of the Invention

The invention relates to an electromechanical brake, which is provided in particular as a vehicle brake for a motor vehicle.

2. Description of the Prior Art

Brakes of this kind are intrinsically known. In order to actuate them, i.e. in order to press a friction brake lining against a rotatable brake body to be braked, the brakes have an electromechanical actuating device equipped with an electric motor and a rotation/translation converting transmission via which the electric motor is able to press the friction brake lining against the brake body. Often, a reduction gear train is connected between the electric motor and the rotation/translation converting transmission. It is customary for the rotation/translation converting transmission to be a screw mechanism. Other mechanisms, for example a rack-and-pinion drive or a cam that the electric motor is able to pivot via the reduction gear train, thereby causing it to press the friction brake lining against the brake body can also be used to convert the rotating drive motion of the electric motor into a translating movement in order to press the friction brake lining against the brake body. It is also conceivable to use an electromagnet in lieu of the electric motor. In the case of a disc brake, the brake body is a brake disc. In the case of a drum brake, it is a brake drum.

One example of an electromechanical brake of this kind is disclosed in DE 102 55 192 A1. To modify the known brake into an auxiliary brake (parking brake), the known brake is equipped with a switchable freewheel, which in the engaged position, locks a motor shaft of the electric motor to prevent it from rotating in a releasing direction of the brake. The locking can occur directly on the motor shaft or indirectly, for example on a transmission shaft. In an actuation or application direction of the brake, the motor shaft is able to rotate freely even when the freewheel is engaged, thus allowing the brake to be actuated but not released. When the freewheel is disengaged, the motor shaft is able to rotate in both rotation directions. It is thus possible to apply and release the brake like a service brake. In the known brake, the freewheel is coaxially flange-mounted to a housing that accommodates the electric motor and the rotation/translation converting transmission.

SUMMARY OF THE INVENTION

The brake according to the invention has a housing that accommodates the electric motor. The housing can also accommodate an optional reduction gear train and/or the rotation/translation converting transmission. A cover is attached to the end of the housing and, according to the invention, constitutes a bearing plate with a bearing for the motor shaft of the electric motor. The freewheel of the brake according to the invention is also accommodated on or in the cover. This integrated design of the cover of the housing for the electric motor reduces the number of individual components and simultaneously reduces the assembly costs of the brake according to the invention. The positional accuracy of the freewheel in relation to the motor shaft is increased since the bearing for the motor shaft is situated in the cover on which or in which the freewheel is also accommodated. It is possible to maintain a high degree of precision of the axial position of the motor shaft in relation to the freewheel. The high degree of axial precision is important in order to assure a reliable switching of the freewheel and avoid an unintended switching of the freewheel. The invention also assures an exact maintenance of an installation angle of the freewheel. The invention enables a compact embodiment of the brake.

The brake according to the invention can be equipped with a self-amplifying device, which converts a friction force exerted by the rotating brake body against the friction brake lining pressed against it during braking into a compressive force that presses the friction brake lining against the brake body in addition to a compressive force exerted by the actuating device, thus increasing the braking force. Examples of possible mechanical self-amplifying devices include wedge or ramp mechanisms or lever mechanisms. Other self-amplifying devices, for example hydraulic ones, are also conceivable.

The electromechanical brake according to the invention can be a disc brake, a drum brake, or another brake design.

Advantageous embodiments and modifications of the invention disclosed in claim 1 are the subject of the dependent claims.

BRIEF DESCRIPTION OF THE DRAWINGS

The invention will be explained in greater detail below in conjunction with an exemplary embodiment shown in the drawings, in which.

DESCRIPTION OF THE PREFERRED EMBODIMENTS

Figure 1:
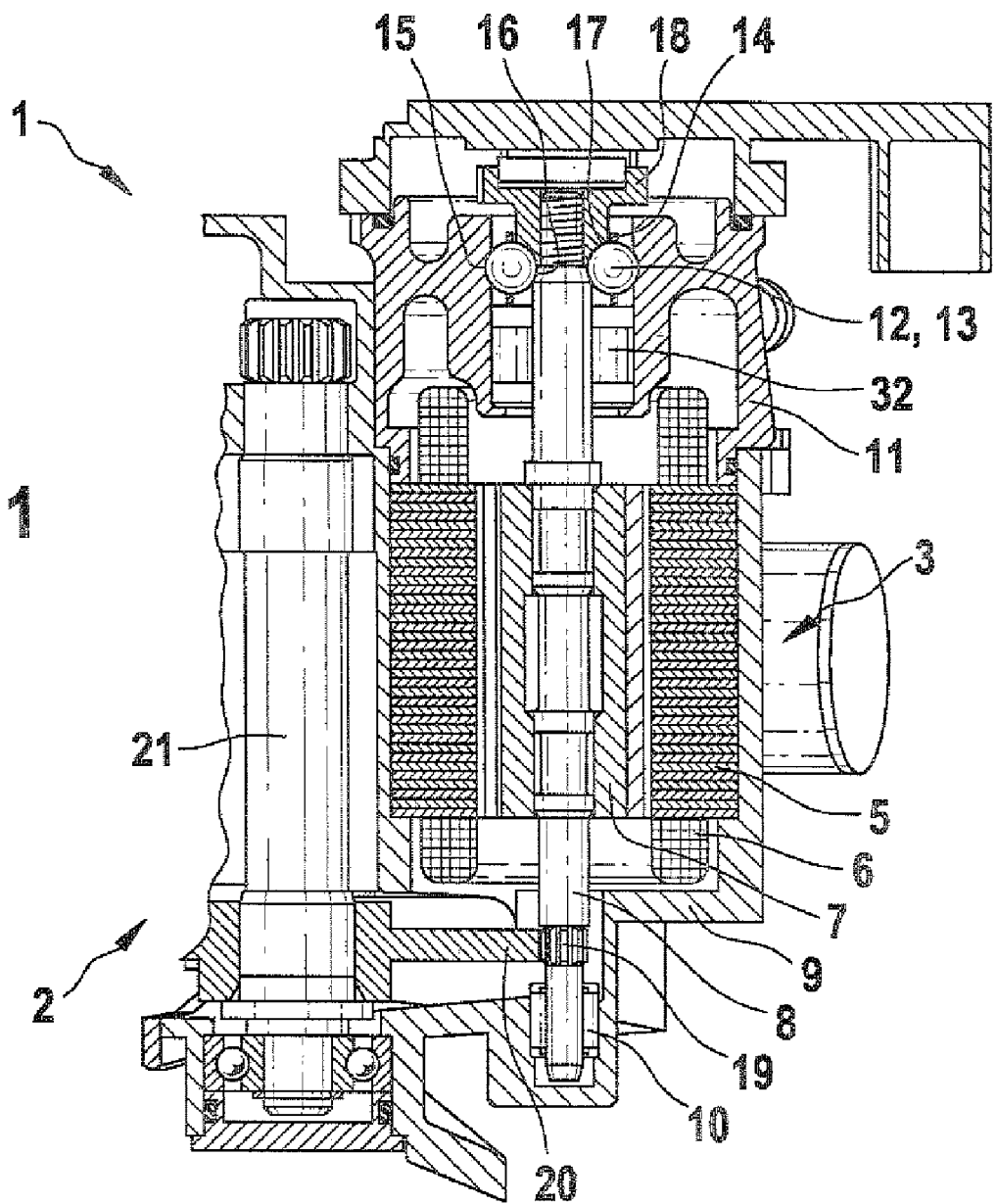
FIG. 1 is a sectional depiction of an electromechanical brake according to the invention.

The brake according to the invention, which is shown in the drawing and labeled as a whole with the reference numeral 1 is a disc brake. It has an electromechanical actuating device 2 equipped with an electric motor 3, a multi-stage gear train and reduction gear train that will be explained below, and a rack-and-pinion drive or other rotation translation converting transmission. The electric motor 3, the reduction gear train, and the rotation/translation converting transmission constitute an electromechanical actuating device of the brake 1. The electric motor 3 has a stator 5 with stator windings 6 and a rotor 7 on a motor shaft 8. The electric motor 3 is an electronically commutated direct-current motor (brushless BLDC motor), but the invention does not absolutely require it to be. The electric motor 3 is accommodated in a housing 9 into which the stator 5 is press-fitted or fixed in some other way. The motor shaft 8 is supported in the housing 9 in rotary fashion at one end by a movable bearing 10, i.e. with axial play. In the exemplary embodiment depicted and described here, a roller bearing is used as the movable bearing 10.

At the other end, the housing 9 is closed by a cover 11 that is manufactured, for example, out of steel or a material of comparable strength. The cover 11 constitutes a bearing plate of a fixed bearing 12 of the electric motor 3. In the exemplary embodiment of the invention depicted and described here, the fixed bearing 12 is embodied in the form of a ball bearing with balls 13 that are secured in rotary fashion in a ball cage 14. A circumferential groove with a circular cross section that is ground into an axial through opening in the cover 11 constitutes an outer bearing ring 15 of the fixed bearing 12. An inner bearing ring of the fixed bearing 12 is split in a plane radial to the motor shaft 8: one half of the inner bearing ring is comprised of a bearing surface 16 with a circular cross section that is ground into an annular step on the motor shaft 8. A second bearing surface 17, also with a circular cross section, is embodied on a nut 18 that is screwed onto the motor shaft 8. The bearing surface 16 of the motor shaft 8 and the bearing surface 17 of the nut 18 combine to form a circumferential groove with a circular cross section and constitute the inner bearing ring 16, 17 of the fixed bearing 12. A bearing play can be adjusted by rotating the nut 18 on the motor shaft 8; for example, the nut 18 is secured against rotation on the motor shaft 8 by a screw-locking varnish.

In lieu of the above-described bearing construction of the fixed bearing 12, the rotary support of the motor shaft 8 in the cover 11 constituting the bearing plate can also be embodied in other ways. For example, a roller bearing can be pressfitted onto the motor shaft 8 and inserted into an annular step in the axial hole in the cover 11 and can be secured there with a retaining ring (not shown).

A pinion 19 that is rotationally secured to the motor shaft 8 and is manufactured, for example, by means of grinding, meshes with a large gear 20, which is supported in a rotationally secured fashion on a first transmission shaft 21. The transmission shaft 21 can be followed by other transmission stages and a brake-applying mechanism for a wheel brake, which mechanism can be actuated in any fashion.

The housing 9 in which the electric motor 3 is accommodated is part of a not otherwise shown brake caliper of the brake 1, which is embodied in the form of a disc brake. The housing 9 can also be attached to the brake caliper. The housing 9 accommodates not only the electric motor 3, but also the entire actuating device, including the brake-applying mechanism. The brake caliper, of which only a fraction is depicted, namely the housing 9, is embodied in an intrinsically known fashion as a floating caliper, i.e. it is guided so that it is able to move transversely in relation to a brake disc that is not shown. As a result, when one friction brake pad is pressed against one side of the brake disc, a second friction brake pad situated on the other side of the brake disc in the brake caliper is pressed in an intrinsically known fashion against the other side of the brake disc so that the brake disc is braked on both sides.

Figure 2:
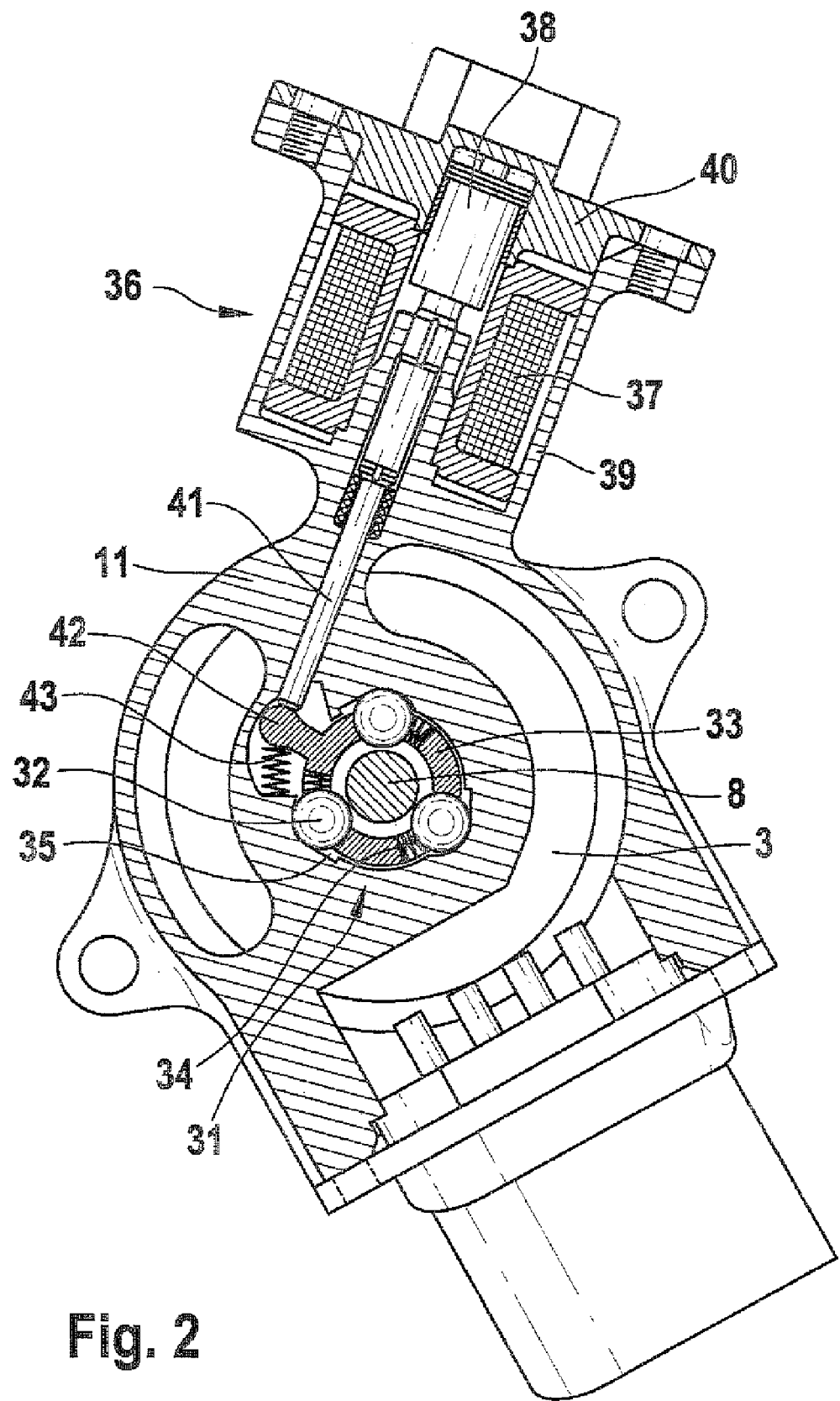
FIG. 2 is a cross section through a cover of a housing of the brake from FIG. 1.

As is clear from FIG. 2, a switchable freewheel 31 is accommodated on or in the cover 11. The freewheel 31 is embodied in the form of a clamping roller freewheel with rollers 32 serving as the clamping or locking elements. Other designs of the freewheel 31 are also possible. The rollers 32 are situated distributed around the motor shaft 8 of the electric motor 3. They are accommodated in recesses of a roller cage 33 that is situated in an annular intermediate space between the motor shaft 8 and the cover 11. Spring elements 34, which are likewise situated in the recesses of the roller cage 33, act on the rollers 32 in the circumference direction so that the rollers 32 are lifted away from the motor shaft 8. The rollers 32 roll in pockets 35 in the axial bore of the cover 11. In this case, a bottom surface of the pockets 35 constitutes a bearing surface for the rollers 32. The bottom surfaces of the pockets 35 constituting the bearing surfaces extend in spiral fashion in relation to the motor shaft 8. Through rotation of the roller cage 33 around the motor shaft 8, the rollers 32 of the freewheel 31 roll in the pockets 35 and move in spiral fashion toward the motor shaft 8. If the rollers 32 are resting against the pockets 35 and against the motor shaft 8, then the spiral course of the pockets causes the rollers 32 to prevent the motor shaft 8 from rotating in one rotation direction. This rotation direction is a releasing direction of the brake 1. The motor shaft 8 is, however, able to rotate in the applying direction. The above-described rotated position of the roller cage 33 is the engaged, locked position of the freewheel 31 in which the freewheel 31 locks to prevent a rotation of the motor shaft 8 in the releasing direction, but permits an actuation of the brake 1.

If the roller cage 33 is rotated back into its starting position and the spring elements 34 lift the rollers 32 away from the motor shaft 8, then the freewheel 31 is disengaged and the motor shaft 8 can rotate freely in both rotation directions.

In order to rotate the roller cage 33 and therefore to engage the freewheel 31, the freewheel 31 is equipped with an electromagnet 36, which has a winding 37 and an armature 38. A housing 39 of the electromagnet 36 is integrally joined to the cover 11 of the housing 9 of the electric motor 3. A cover 40 that closes the housing 39 of the electromagnet 36 constitutes a yoke of the electromagnet 36, which closes the magnetic flux path. The electromagnet 36 switches the freewheel 31 by means of a tappet 41 that is situated tangential to the roller cage 33 of the freewheel 31. The tappet 41 engages a cam 42 that protrudes radially outward from the roller cage 33; the opposite side of this cam is acted on by a spring element 43 in the form of a helical compression spring, which is accommodated in a pocket in the cover 11, outside of the roller cage 33, and is supported in the cover 11. When current is supplied to the coil 37 of the electromagnet 36, this exerts traction on the armature 38 and, via the tappet 41, pushes against the cam 42 of the roller cage 33 of the freewheel 31. This rotates the roller cage 33 into the engaged position as described above. In the engaged position of the freewheel 31, the brake 1 can be applied further, but cannot be released. If the brake 1 is actuated while the freewheel 31 is engaged, a mechanical stress builds up, which keeps the rollers 32 of the freewheel 31 clamped between the motor shaft 8 and the cover 11 even if the electromagnet 36 is no longer supplied with current. The brake 1 is therefore kept in the actuated position even when it is without current and can thus be used as an auxiliary brake. In order to release the actuated brake 1, the electric motor 3 actuates it, which releases the mechanical prestressing so that the spring element 43 rotates the roller cage 33 of the freewheel 31 back into the disengaged position. The motor shaft 8 is then able to rotate freely and the brake 1 can be released and used as a service brake. The cover 11—which is equipped with the pockets 35 for the rollers 32, cooperates with the rollers 32 and together with the rollers 32, prevents the motor shaft 8 from rotating in the releasing direction of the brake 1 when the freewheel 31 is engaged—constitutes part of a locking mechanism of the freewheel 31.

The cover 11 of the housing 9 contains all of the electrical lines of both the electric motor 3 and the electromagnet 36; the electrical lines are brought together in one or more electrical plugs that are not shown in the drawing. This has the advantage of achieving a simple electrical connection of the electric components of the brake 1 according to the invention.

The foregoing relates to preferred exemplary embodiments of the invention, it being understood that other variants and embodiments thereof are possible within the spirit and scope of the invention, the latter being defined by the appended claims.

The invention claimed is:

1. An electromechanical brake comprising:
an electric motor having a motor shaft and a rotor attached to the motor shaft;
a rotation/translation converting transmission connected to the electric motor in a manner so as to actuate the brake;

a housing accommodating the electric motor therein, wherein the housing has an end face and the motor shaft of the electric motor is rotatably supported within the housing;

a cover attached to the housing at the end face of the housing;

a switchable freewheel having clamping elements connected to the motor shaft, wherein the clamping elements are distributed around the motor shaft and are accommodated in an annular intermediate space between the motor shaft and the cover in a manner such that in an engaged position the clamping elements lock with respect to the motor shaft to permit rotation of the motor shaft in a brake applying direction of the brake and prevent the motor shaft of the electric motor from rotating in a releasing direction of the brake, and wherein the cover forms a bearing plate for the motor shaft of the electric motor and wherein the clamping elements of the freewheel are accommodated in the cover.

2. The electromechanical brake as recited in claim 1, wherein the cover comprises a bearing ring for a fixed bearing of the motor shaft.

3. The electromechanical brake as recited in claim 2, wherein the fixed bearing is embodied in the form of a ball bearing with balls secured in rotary fashion in a ball cage.

4. The electromechanical brake as recited in claim 2, wherein the bearing ring is embodied as a circumferential groove with a circular cross section in the cover and constitutes an outer bearing ring of the fixed bearing.

5. The electromechanical brake as recited in claim 2, wherein an inner bearing ring of the fixed bearing is split in a plane radial to the motor shaft, one half of the inner bearing ring comprising a bearing surface with a circular cross section on the motor shaft.

6. The electromechanical brake as recited in claim 5, wherein the bearing surface on the motor shaft is ground into an annular step of the motor shaft.

7. The electromechanical brake as recited in claim 5, wherein a second bearing surface with a circular cross section is embodied on a nut that is screwed onto the motor shaft.

8. The electromechanical brake as recited in claim 7, wherein the bearing surface of the motor shaft and the bearing surface of the nut combine to form a circumferential groove with a circular cross section and constitutes the inner bearing ring of the fixed bearing.

9. The electromechanical brake as recited in claim 1, wherein at least a part of a bearing ring of a bearing of the motor shaft is an integral component of the motor shaft and wherein said part of the bearing ring fixes the motor shaft in an axial direction.

10. The electromechanical brake as recited in claim 1, wherein the cover is part of a locking mechanism of the freewheel.

11. The electromechanical brake as recited in claim 1, wherein the cover contains all electrical connections of the electric motor and of the freewheel.

12. The electromechanical brake as recited in claim 1, wherein the brake is a disc brake and the housing is part of a brake caliper of the brake.

13. The electromechanical brake as recited in claim 1, wherein the cover comprises a housing for the clamping elements of the freewheel.

14. The electromechanical brake as recited in claim 1, wherein the clamping elements are rollers and wherein spring elements situated in recesses of a roller cage act on the rollers in a circumferential direction so that the rollers are lifted away from the motor shaft.

15. The electromechanical brake as recited in claim 1, wherein the clamping elements are rollers and the rollers roll in pockets in an axial bore of the cover and bottom surfaces of the pockets constitutes bearing surfaces for the rollers.

16. The electromechanical brake as recited in claim 15, wherein the bottom surfaces of the pockets constituting the bearing surfaces extend in a spiral fashion in relation to the motor shaft.

17. The electromechanical brake as recited in claim 16, wherein, through rotation of the roller cage around the motor shaft, the rollers of the freewheel roll in the pockets and move in spiral fashion toward the motor shaft.

18. The electromechanical brake as recited in claim 17, wherein, when the rollers are resting against the pockets and against the motor shaft, the spiral course of the pockets causes the rollers to prevent the motor shaft from rotating in the releasing direction of the brake.

19. The electromechanical brake as recited in claim 1, wherein the freewheel is equipped with an electromagnet that switches the freewheel by means of a tappet situated tangential to a roller cage into the engaged position.

20. The electromechanical brake as recited in claim 19, wherein the tappet engages a cam that protrudes radially outward from the roller cage to rotate the freewheel into the engaged position.

* * * * *

UNITED STATES PATENT AND TRADEMARK OFFICE
CERTIFICATE OF CORRECTION

| | |
|---|---|
| PATENT NO. | : 8,020,675 B2 |
| APPLICATION NO. | : 11/997255 |
| DATED | : January 29, 2008 |
| INVENTOR(S) | : Chi-Thuan Cao et al. |

It is certified that error appears in the above-identified patent and that said Letters Patent is hereby corrected as shown below:

- Page 6, Column 5, Line 21: Correct "hearing" to "bearing".

Signed and Sealed this
Fourteenth Day of February, 2012

David J. Kappos
*Director of the United States Patent and Trademark Office*